United States Patent [19]
Hansen

[11] 3,711,721
[45] Jan. 16, 1973

[54] AUTOMATIC EXPOSURE CONTROL FOR CONTROLLING PHOTOGRAPHIC SHUTTER

[76] Inventor: Donald H. Hansen, 1331 N. Forest, Williamsville, N.Y. 14221

[22] Filed: Oct. 7, 1971

[21] Appl. No.: 187,331

[52] U.S. Cl. ............. 250/214 P, 95/10 CT, 250/206
[51] Int. Cl. ........................ G01j 1/00, H01j 39/12
[58] Field of Search .......... 250/214 P, 206; 95/10 CT

[56] References Cited

FOREIGN PATENTS OR APPLICATIONS 864,320   4/1961   Great Britain ................... 250/214 P Primary Examiner—James W. Lawrence
Assistant Examiner—T. N. Grigsby
Attorney—William C. Nealon et al.

[57] ABSTRACT

A camera shutter is controlled by a capacitive circuit, with a square wave generator of variable frequency and pulse width to control the charging characteristics of the capacitor which is analogized to the reciprocity failure of the camera film.

10 Claims, 3 Drawing Figures

AUTOMATIC EXPOSURE CONTROL FOR CONTROLLING PHOTOGRAPHIC SHUTTER

BACKGROUND OF THE INVENTION

The present invention relates in general to photographic shutter and exposure control, and more particularly to exposure control for long-exposure photography which includes a compensation for the reciprocity failure characteristic of the film.

In the prior art, exposure controls which are correlated to various parameters of the photographic film and to the amount of light flux incident thereon are known. The most relevant prior art in this regard are exposure controls of the capacitance type. In this type of control, a capacitor is charged at a rate proportional to the illumination to which the film is subject, for example by exposing a photocell to the same illumination. The charge or a capacitor is the time integral of current into the capacitor. Analogously, film exposure is the time integral of light flux incident on the film. Therefore, the capacitor integrates current with respect to time as the photographic film integrates incident light flux with respect to time. At a given predetermined level of voltage on the capacitor, the camera shutter is closed.

In such an arrangement, the speed of the film (ASA) is an analog of the capacitance. That is, a capacitance having a given charging rate is used in conjunction with a given ASA film having a given rate at which it becomes light-saturated.

Prior art exposure controls do not take into account or compensate for the reciprocity failure characteristic of a film. Reciprocity failure is that property of a photographic emulsion by which its light-sensitivity decays during time of exposure. That is to say, the curve of sensitivity vs. exposure time is non-linear. For long exposure times, as are typical for example in microphotography, this change of film characteristic becomes significant.

SUMMARY OF THE INVENTION

It is an object of the present invention to provide a photographic exposure control which compensates for film reciprocity failure as well as the other parameters of film speed, format, and density.

Another object is to provide such an exposure control for photomicrographic apparatus to enhance the reliability of such apparatus, particularly where short lived specimens are involved.

Other objects, advantages, and features of this invention will become apparent from the following description of one embodiment thereof, taken in connection with the accompanying drawing.

Briefly, the present invention is practiced in one form by a photographic exposure control operatively connected to a camera shutter and signalling the same to close at a certain voltage level on a capacitor. The charging capacitor simulates the collection of light by the film and is correlated to the light by a photocell subjected to the same illumination as is the film. In order to compensate for the film reciprocity failure, the sensitivity of the photocell is attenuated by controlling the current flow therethrough. This is accomplished by a square wave having a decaying pulse repetition rate which is made to correspond to the decaying film speed (reciprocity failure).

DRAWING

DESCRIPTION

Figure 1:
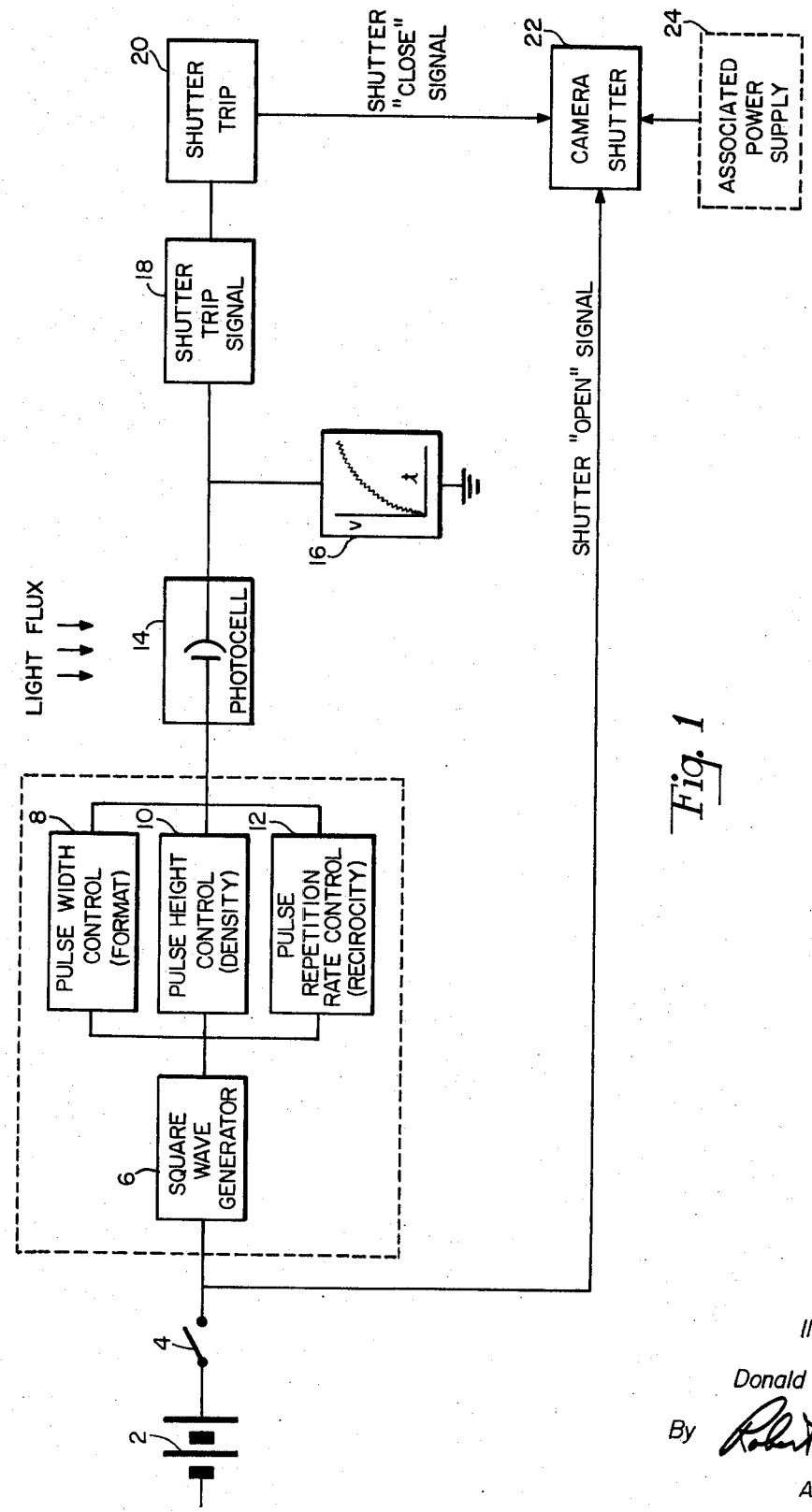
FIG. 1 is a schematic or block diagram of the system of the present invention.

Referring now to FIG. 1, a source of DC voltage is shown at 2. It is represented as a battery but could be any suitable DC source, as for example a rectified AC voltage. Source 2 is connected through a switch 4 to a square wave generator 6. Square wave generator 6 leads, on its output side, to a pulse width control 8, a pulse height control 10, and a pulse repetition rate control 12, all operatively connected to the generator 6 to modity its output signal. A photocell 14 is series-connected in the circuit as shown and is disposed in the camera system so as to be subject to the same illumination as the film. Photocell 14 leads through parallel paths to a grounded capacitor 16 and a voltage sensor 18. Voltage sensor 18 is operatively connected to a solenoid 20 which forms a part of a camera shutter 22 to close the same when signalled by the voltage sensor 18.

The combination of elements 2, 4, 14, 16, 18, 20, and 22 is considered typical of the prior art. In such a prior art arrangement, a constant voltage is applied to the photocell, and during exposure the photocell output is directly related to the illumination on the cell (which is the same as that on the camera film). At a certain level of voltage, as charge is collected on the capacitor, a shutter trip signal closes the camera shutter. In such an arrangement, the exposure time is a function only of the time integral of the illuminance on the photocell (and therefore on the film). Other factors, particularly the reciprocity failure characteristic of the film, are not compensated for, except for a small amount due to the non-linear charging rate of a capacitor.

In order to provide compensation for the reciprocity failure of the film, the sensitivity of the photocell is modulated. That is, its light response is attenuated as a function of time along a curve simulating that along which the film response decreases as a function of exposure time. This control of the photocell response can be accomplished either by controlling the photocell illuminance along a suitable curve or by controlling the current through the photocell. In the presently preferred embodiment of this invention, the photocell is attenuated electrically by controlling the current through the cell. This is done by supplying the photocell with an electrically generated square wave, the pulse repetition rate (frequency), pulse height, and pulse width (duty cycle) of which are all controllable.

The frequency control 12 provides a certain decay of the frequency as a function of time which rate can be set or adjusted by the operator to correspond to the reciprocity failure rate of the film (such reciprocity being known). The frequency control 12 thus acts as a function generator to match its output signal to a non-linear physical characteristic (i.e. the film reciprocity). This control is effected by a suitable RC control in the circuit.

The sensitivity of the photocell is further controlled to provide for various camera backs (format) and for various film densities that may be used. Pulse width control 8 controls the duty cycle of the square wave and this is correlated to format. Control 8 is an RC control to vary the time constant of the square wave.

Pulse height control 10 controls the voltage level of the pulses, and this is correlated to film density or light/dark film characteristic. This control 10 is a variable or selectively changeable resistance in the circuit.

Film speed (ASA), or the rate at which the film collects light, is a correlate of the capacitance or the rate at which the capacitor 16 collects charge. Therefore, various capacitances or capacitors can be selected and switched into the circuit depending on the ASA characteristic of the film used. Capacitor 16 may therefore be a plurality of capacitors selectively switchable into the circuit.

In operation, when switch 4 is closed the camera shutter is opened and the circuit energized. Light flux incident on the photocell controls the charging current to the capacitor. When capacitor 16 reaches a predetermined voltage level, the shutter trip signal at 18 signals the shutter trip 20 to close the camera shutter 22. By controlling the output of the photocell 14, the charge or voltage collected in the capacitor 16 can be made to follow a curve with respect to time to simulate that along which the film collects light with respect to time. Thus, though the film loses sensitivity during time of exposure, the photocell-controlled capacitor is compensating for this by collecting charge at a correspondingly decaying rate.

The system described above generally operates with voltages and currents of signal magnitude only. An associated power circuit 24 preferably would be included as a practical matter. The details of such a circuit or associated system are not material to this invention however, and need not be further described.

Figure 2:
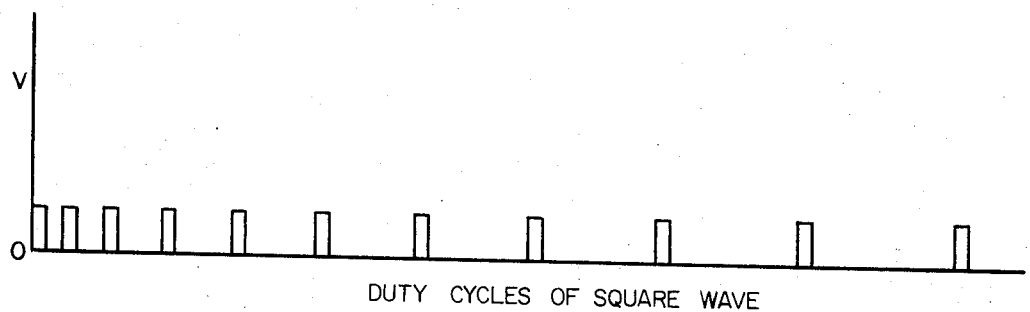
FIG. 2 is a plot of voltage vs. time showing the charging characteristic of the capacitor in response to the input current represented.

FIG. 2 shows a plot of voltage as a function of time. This plot represents the current output of photocell 14. The pulses shown are the duty cycles of the square wave and, as is apparent, the frequency of the square wave is decaying at a given controlled rate.

Figure 3:
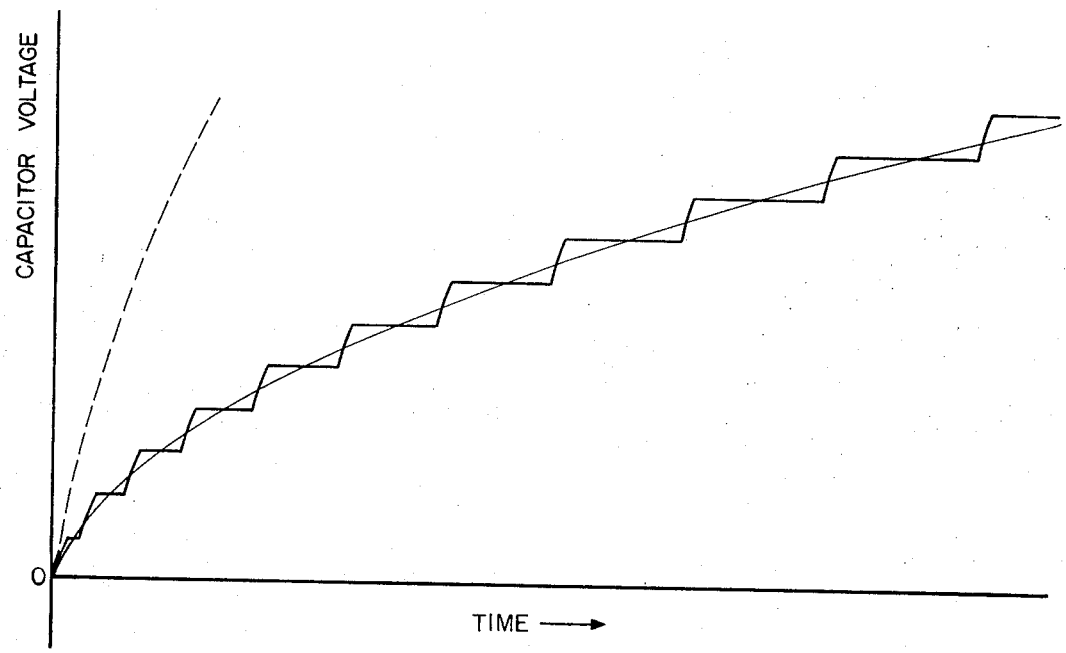
FIG. 3 is a curve of capacitor voltage as a function of time.

FIG. 3 shows a curve of capacitor voltage as a function of time. This is a detail of the charging curve schematically represented in FIG. 1 at 16. FIG. 3 is directly beneath FIG. 2 and the time scales are concurrent.

The photocell output represented in FIG. 2 is the charging potential which is integrated by the capacitor as represented in FIG. 3. It will be appreciated that an uninterrupted direct current, i.e. a duty cycle of unity, will charge a capacitor along a curve typified by the phantom line. However, the intermittent pulses of the square wave which have a duty cycle less than unity, are used in the present invention to charge the capacitor at a rate illustrated by the stepped curve. That is, when potential is applied to the capacitor during the pulse of the duty cycle, charge accumulates and during the remaining portion of the period, no charge accumulates. Thus, the resultant curve is displaced to the right as shown and the charging time of the capacitor has been increased.

It is apparent from FIGS. 2 and 3 that the charging rate of the capacitor can be controlled by controlling the output of the photocell. This photocell output can, in turn, be controlled by controlling the decay of the square wave frequency. Thus, it is possible to electrically simulate any film reciprocity failure rate. Of course, the frequency of the square wave can be controlled so as to decay at any desired rate, linear or non-linear, the decay rate shown in FIG. 2 merely being illustrative.

It will be apparent that a photographic exposure control has been provided hereby which is able to compensate for the various parameters of film reciprocity failure, film speed, format, and density.

It may occur to others of skill in the art to make modifications of this invention which will lie within its concept and scope and not constitute a departure. Accordingly, it is intended that the invention be not limited by the details of its description, but only by the following claims.

What is claimed is:

1. An analog photographic exposure control in which a camera shutter is signalled to close at a determined level of voltage, and including:
   a photocell disposed in the camera system and subject to the same illumination as the film in said camera,
   said photocell connected to a capacitor and effective to discharge to said capacitor in response to light flux incident on said photocell,
   means to vary the charging potential to the capacitor as a function of time to simulate the reciprocity failure rate of the film.

2. An analog photographic exposure control as defined in claim 1 wherein said means includes:
   a square wave generator to supply a square wave voltage to said photocell,
   pulse repetition rate control means to vary the frequency of the square wave along a desired curve with respect to time to simulate the curve along which film sensitivity decreases with respect to time during exposure.

3. An analog photographic exposure control as defined in claim 1 and further including:
   format control means to modify the charging potential to said capacitor to accommodate for various formats of film which may be used in said camera.

4. An analog photographic exposure control as defined in claim 3 in which said format control means includes:
   a square wave generator to supply a square wave voltage to said photocell, and
   pulse width control means to control the width of the pulses from said square wave generator.

5. An analog photographic exposure control as defined in claim 1 and further including:
   density control means to modify the charging potential to said capacitor to compensate for small differences in film speed or object contrast.

6. An analog photographic exposure control as defined in claim 5 in which said density control means includes:
   a square wave generator to supply a square wave voltage to said photocell, and
   pulse height control means to control the height of the pulses from said square wave generator.

7. An analog photographic exposure control in which a camera shutter is signalled to close at a determined level of voltage, and including:

a photocell disposed in the camera system and subject to the same illumination as the film in said camera, said photocell connected to a capacitor and effective to discharge to said capacitor in response to light flux incident on said photocell, means to apply the charging potential to said capacitor at a duty cycle less than unity, control means to vary the frequency of the pulses to simulate the reciprocity failure rate of the film during exposure, control means to vary the duration of said pulses to accomodate various formats of film, and control means to vary the pulse voltage to compensate for small differences in film speed or object contrast.

8. An analog photographic exposure control as defined in claim 7 wherein said means to apply the charging potential to said capacitor includes:

a square wave generator to supply a square wave voltage to said photocell, and said control means to vary the frequency of the pulses includes pulse repetition rate control means to vary the frequency of the square wave with respect to time.

9. An analog photographic exposure control as defined in claim 8, wherein the frequency of the square wave decays at a non-linear rate.

10. An analog photographic exposure control as defined in claim 8, wherein the frequency of the square wave decays at a linear rate.

* * * * *